Patented Apr. 16, 1929.

1,709,242

UNITED STATES PATENT OFFICE.

HERBERT A. WINKELMANN, OF AKRON, OHIO, ASSIGNOR TO THE PHILADELPHIA RUBBER WORKS COMPANY, OF AKRON, OHIO, A CORPORATION OF OHIO.

COMPOSITION OF MATTER AND METHOD OF MAKING SAME.

No Drawing. Application filed October 28, 1927. Serial No. 229,541.

This invention relates to compositions derived by blowing a mixture of pine tar and petroleum flux and has for an object to provide a composition suitable as a molding compound for the manufacture of electrical insulation, battery containers, etc., and as a compounding ingredient in rubber goods, and particularly to provide materials of this character which shall have high tensile and impact strength and which shall be readily moldable and readily admixed with pigment, softeners, fillers and vulcanizing agents, as well as with rubber. A further object is to produce a method for preparing these compositions.

It has heretofore been proposed to treat oil fluxes and other asphaltic bitumens at relatively high temperatures by agitation with blasts of air blown therethrough to effect a gradual change in the chemical and physical characteristics of the products treated. The character of the change thus effected is not completely known but is generally considered to include polymerization and oxidation, the result of this blowing being to increase the softening temperature of the hydrocarbon constituents, the products being commonly known as blown oils or blown asphalts.

I have found that blown products having superior properties may be prepared by admixing pine tar with petroleum oil fluxes, heating and stirring the two when necessary, and then subjecting the admixture to a blowing action with air. The resulting product is a jet black, friable solid material which breaks with a glossy conchoidal fracture and which possesses in a high degree a capacity of admixing with and binding large amounts of fillers, softeners and fibers.

The following specific examples are illustrative embodiments of my invention, which however, is not limited to the specific examples herein given.

*Example 1.*—In a simple embodiment of my invention, two parts of petroleum oil flux (flash point 450° F.) were admixed with one part of heavy pine tar, the two heated and subjected to a blowing action with air until a product having a softening temperature of 220° F. was obtained. The resulting product was a jet black, hard, brittle solid material which breaks with a smooth glossy conchoidal fracture. This blown product was tested in a series of rubber recipes consisting substantially of 60 parts of rubber, 25 parts of carbon black, 5 parts of zinc oxide, 2 parts of sulfur, .5 parts accelerator and 2 parts of the above described blown product of mixed flux and pine tar. When this composition was cured in a press for thirty minutes at 300° F., it gave a tensile strength of 3650 pounds per square inch. In higher proportions a similar improved result was obtained, from 2 to 7 percent of this blown product in rubber compositions giving satisfactory products.

The addition of asphalts, either the natural asphalts like Gilsonite, Trinidad, etc., or similar natural or manufactured asphalts, to the flux and pine tar mixture before blowing gives a satisfactory product for many purposes.

*Example 2.*—A product of superior quality is made by admixing 60 parts by weight of petroleum oil flux (flash point 450° F.), 6.6 parts of asphalt (softening temperature 350° F.) and 33.3 parts of extra heavy pine tar. These ingredients were heated and subjected to a blowing action with air until a sample test showed the product to have a softening temperature of 240° F. The product obtained was a jet black, hard, brittle solid material which broke with a well formed glossy conchoidal fracture. This blown product was admixed in a rubber stock consisting of rubber 100 parts by weight, zinc oxide 10 parts, sulphur 4 parts, accelerator .75 parts, blown product 10 parts, and cured in a press at 40 pounds steam pressure. A tensile strength of 3250 pounds per square inch was obtained in a 45 minute cure. As high as 20 parts by weight of the blown product of this example to 100 parts with rubber have been satisfactorily employed in rubber compositions. It is to be understood, however, that the proportions may be varied widely to secure desired results.

I also found that rubber, either crude or vulcanized but preferably in the form of ground pneumatic tire treads or ground solid tires, may be added to an admixture of pine tar and oil flux, or of pine tar, oil flux and asphalt, before blowing or during the blowing of these admixtures, the resulting blown product having greater strength than the products formed without the addition of the rubber. These products are similar in appearance to the products above described, being jet black, hard and of homogeneous construction. They are particularly adapted for the manufacture of molded goods and have a capacity of admixing with and binding large proportions of fillers, softeners, and fibers.

The still residues after distillation of crude petroleum of asphaltic or semi-asphaltic basis are commonly known in the trade as "fluxes", a term herein employed to designate such residues.

The numeral values indicating the softening temperatures of the various materials described in this specification are those determined by the ball and ring method adapted by the American Association for Testing Materials, commonly known as the A. S. T. M. standards, and a further description thereof is therefore deemed to be unnecessary herein.

It will be understood that numerous variations and modifications in the process hereinabove described may be resorted to within the scope of this invention and I therefore do not wholly limit the claims herein to the specific procedures or products described.

I claim:

1. The herein described method which comprises admixing a petroleum oil flux with pine tar and subjecting the admixture to a blowing action with air under the influence of heat.

2. The herein described process which comprises admixing a petroleum oil flux, a pine tar and an asphalt, and subjecting the admixture to heat and to a blowing action with air.

3. The herein described method which comprises admixing a petroleum oil flux, a pine tar, subjecting the admixture to heat and to a blowing action of air, and adding to the admixture before the completion of the blowing action ground vulcanized rubber.

4. The herein described process which comprises admixing petroleum oil flux, a pine tar, and asphalt, subjecting the admixture to heat and to a glowing action with air, and adding to said admixture prior to the completion of the blowing action ground vulcanized rubber.

5. The herein described process which comprises admixing a petroleum residue with pine tar, subjecting the admixture to heat and to a blowing action of air, adding the blown product thus obtained to a rubber composition, and vulcanizing.

6. The herein described method which comprises admixing a petroleum oil flux, a pine tar, and asphalt, subjecting the admixture to heat and to a blowing action with air, adding the resulting product to a vulcanizable rubber composition, and vulcanizing.

7. A composition of matter comprising the product resulting from blowing with air under the influence of heat an admixture of petroleum oil flux and pine tar.

8. The composition of matter comprising the product resulting from the blowing with air under the influence of heat an admixture of petroleum oil flux, a pine tar, and asphalt.

9. The composition of matter comprising the product resulting from blowing with air under the influence of heat an admixture of a petroleum oil flux, a pine tar, and vulcanized rubber.

10. The composition of matter comprising the product resulting from the blowing with air under the influence of heat of an admixture containing a petroleum oil flux, a pine tar, an asphalt, and vulcanized rubber.

11. As a new composition of matter, vulcanized rubber containing before vulcanization the blown product of mixed petroleum flux and pine tar.

12. As a new composition of matter vulcanized rubber containing before the vulcanization the blown product of mixed petroleum flux, pine tar and asphalt.

In witness whereof I have hereunto set my hand this 21st day of October, 1927.

HERBERT A. WINKELMANN.

---

CERTIFICATE OF CORRECTION.

Patent No. 1,709,242.

Granted April 16, 1929, to

HERBERT A. WINKELMANN.

It is hereby certified that the State of Incorporation of the assignee in the above numbered patent was erroneously given as "Ohio", whereas said State should have been given as "Delaware", as shown by the records of assignments in this office; and that the said Letters Patent should be read with this correction therein that the same may conform to the record of the case in the Patent Office.

Signed and sealed this 18th day of June, A. D. 1929.

M. J. Moore,
Acting Commissioner of Patents.

(Seal)

have a capacity of admixing with and binding large proportions of fillers, softeners, and fibers.

The still residues after distillation of crude petroleum of asphaltic or semi-asphaltic basis are commonly known in the trade as "fluxes", a term herein employed to designate such residues.

The numeral values indicating the softening temperatures of the various materials described in this specification are those determined by the ball and ring method adapted by the American Association for Testing Materials, commonly known as the A. S. T. M. standards, and a further description thereof is therefore deemed to be unnecessary herein.

It will be understood that numerous variations and modifications in the process hereinabove described may be resorted to within the scope of this invention and I therefore do not wholly limit the claims herein to the specific procedures or products described.

I claim:

1. The herein described method which comprises admixing a petroleum oil flux with pine tar and subjecting the admixture to a blowing action with air under the influence of heat.

2. The herein described process which comprises admixing a petroleum oil flux, a pine tar and an asphalt, and subjecting the admixture to heat and to a blowing action with air.

3. The herein described method which comprises admixing a petroleum oil flux, a pine tar, subjecting the admixture to heat and to a blowing action of air, and adding to the admixture before the completion of the blowing action ground vulcanized rubber.

4. The herein described process which comprises admixing petroleum oil flux, a pine tar, and asphalt, subjecting the admixture to heat and to a glowing action with air, and adding to said admixture prior to the completion of the blowing action ground vulcanized rubber.

5. The herein described process which comprises admixing a petroleum residue with pine tar, subjecting the admixture to heat and to a blowing action of air, adding the blown product thus obtained to a rubber composition, and vulcanizing.

6. The herein described method which comprises admixing a petroleum oil flux, a pine tar, and asphalt, subjecting the admixture to heat and to a blowing action with air, adding the resulting product to a vulcanizable rubber composition, and vulcanizing.

7. A composition of matter comprising the product resulting from blowing with air under the influence of heat an admixture of petroleum oil flux and pine tar.

8. The composition of matter comprising the product resulting from the blowing with air under the influence of heat an admixture of petroleum oil flux, a pine tar, and asphalt.

9. The composition of matter comprising the product resulting from blowing with air under the influence of heat an admixture of a petroleum oil flux, a pine tar, and vulcanized rubber.

10. The composition of matter comprising the product resulting from the blowing with air under the influence of heat of an admixture containing a petroleum oil flux, a pine tar, an asphalt, and vulcanized rubber.

11. As a new composition of matter, vulcanized rubber containing before vulcanization the blown product of mixed petroleum flux and pine tar.

12. As a new composition of matter vulcanized rubber containing before the vulcanization the blown product of mixed petroleum flux, pine tar and asphalt.

In witness whereof I have hereunto set my hand this 21st day of October, 1927.

HERBERT A. WINKELMANN.

CERTIFICATE OF CORRECTION.

Patent No. 1,709,242.

Granted April 16, 1929, to

HERBERT A. WINKELMANN.

It is hereby certified that the State of Incorporation of the assignee in the above numbered patent was erroneously given as "Ohio", whereas said State should have been given as "Delaware", as shown by the records of assignments in this office; and that the said Letters Patent should be read with this correction there in that the same may conform to the record of the case in the Patent Office.

Signed and sealed this 18th day of June, A. D. 1929.

(Seal)

M. J. Moore,
Acting Commissioner of Patents.